Figure 5:
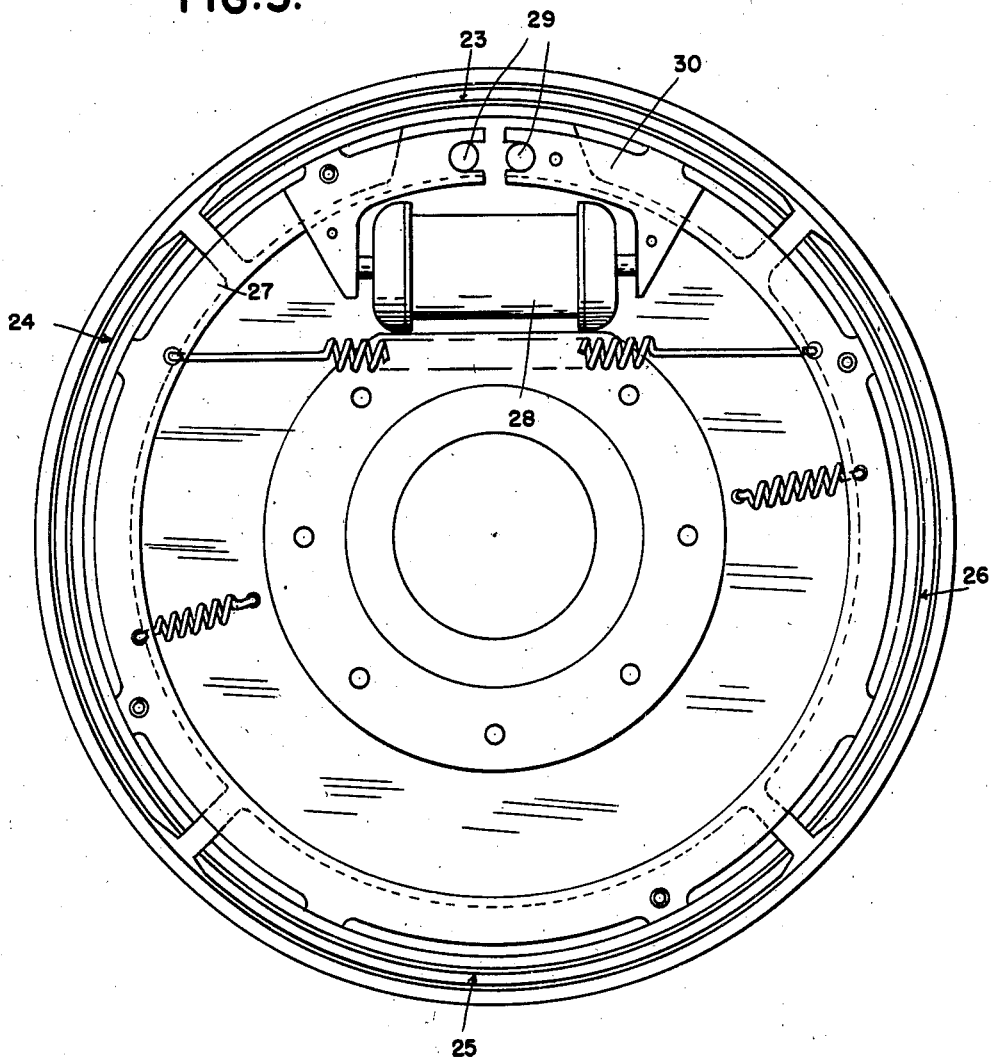

Oct. 5, 1943.    J. A. FORBES    2,330,879
BRAKE
Filed July 21, 1941    2 Sheets-Sheet 1
FIG.1.
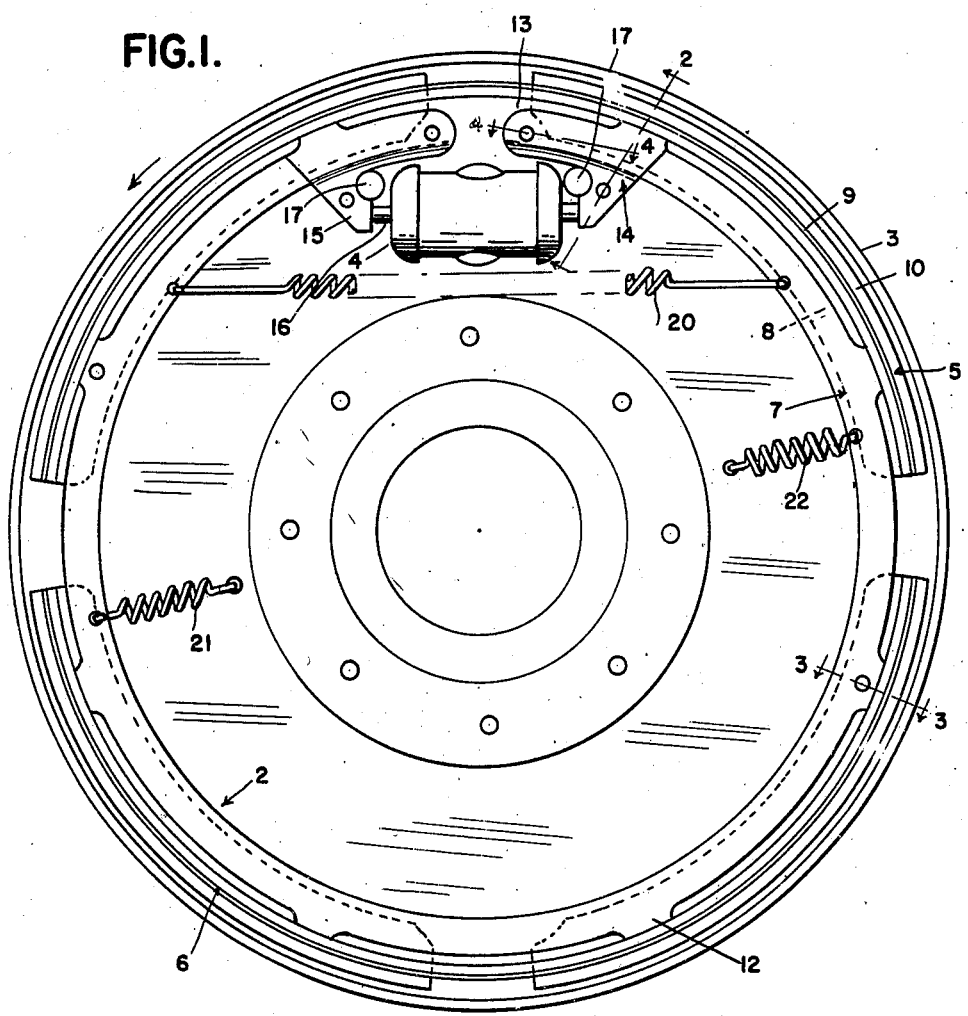
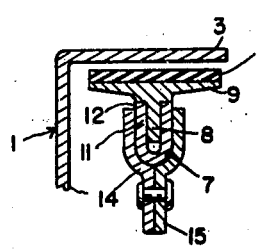
FIG.2.
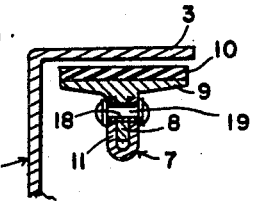
FIG.3.
FIG.4.
INVENTOR.
JOSEPH A. FORBES
BY *Whittemore Hulbert & Belknap*
ATTORNEYS Oct. 5, 1943.　　　　J. A. FORBES　　　　2,330,879
BRAKE
Filed July 21, 1941　　　2 Sheets-Sheet 2

INVENTOR.
JOSEPH FORBES
BY
ATTORNEYS

Patented Oct. 5, 1943

2,330,879

UNITED STATES PATENT OFFICE 2,330,879

BRAKE

Joseph A. Forbes, Detroit, Mich., assignor to Kelsey-Hayes Wheel Company, Detroit, Mich., a corporation of Delaware Application July 21, 1941, Serial No. 403,434

9 Claims. (Cl. 188—78)

The invention relates to brakes and refers more particularly to internal brakes adapted for use with motor vehicle and airplane wheels.

The invention has for an object to provide a simple construction of brake which is powerful in action.

The invention has for another object to provide a brake of the momentum type in which friction members are adapted to be forced against a brake drum by means utilizing the torque of the friction members after the brake has been applied.

The invention has for a further object to provide a brake in which a transversely split ring is expansible to force the friction members against the brake drum and the friction members are operatively connected to the ring to transfer their torque to the ring to increase the expanding force applied to the ring.

With these and other objects in view, the invention resides in the novel features of construction and combinations and arrangements of parts as more fully hereinafter set forth.

In the drawings:

Figure 1 is an elevation of a brake embodying my invention;

Figures 2, 3 and 4 are cross sections on the lines 2—2, 3—3 and 4—4, respectively, of Figure 1;

Figure 5 is a view similar to Figure 1 showing another embodiment of my invention.

The brake, as illustrated in Figures 1 to 4 inclusive, comprises the brake drum 1 adapted to be secured to a wheel of a motor vehicle, airplane, or the like, and the internal friction device 2 within and engageable with the brake flange 3 of the drum when applied by the actuator 4.

The internal friction device comprises the friction members 5 and 6 and the expansible transversely split ring 7 for forcing the friction members against the brake flange when expanded by means of the actuator 4. The friction members are alike and each comprises a T-section shoe having the radial web 8 and the axial flange 9 to which is secured the lining 10 engageable with the brake flange 3. The ring 7 is of U-section and embraces the webs 8 of the brake shoes, the legs 11 of the ring being at opposite sides of the webs. The legs are preferably formed with the angularly spaced radially outwardly extending projections 12 engageable with the axial flanges of the shoes to force the latter outwardly at angularly spaced zones against the brake flange of the brake drum. The webs 8 of the brake shoes are cut away midway between their ends at 13, but the axial flanges are continuous from end to end. The ends of the ring have secured thereto the reinforcements 14 each of which is formed of a pair of fashioned plates at opposite sides of the ring and extending peripherally beyond the intermediate ends of the webs of one of the brake shoes. The ends of these plates are riveted to the ends of the ring and the plates are formed with generally radially inwardly extending portions radially inwardly of the ring and riveted together to form the projections 15. The actuator 4, as shown, is a wheel cylinder of usual construction mounted on the backing plate for the brake drum and located between the projections 15. The wheel cylinder has the rods 16 which are connected to its pistons and which abut the projections 15 and are adapted when braking liquid is forced into the wheel cylinder to relatively move the ends of the ring away from each other through their reinforcements to expand the ring. 17 are anchor pins secured to the backing plate and engageable with the projections 15 radially outwardly of the zone of engagement of the piston rods with the projections. The anchor pins serve to anchor the ring at either end depending upon the direction of rotation of the brake drum.

For the purpose of utilizing the torque of each of the friction members to increase the expanding force applied to the ring, each of the friction members is connected to the ring by the transverse hollow pin 18 which extends through the web of the friction member and the legs of the ring. A rivet 19 extends through the hollow pin and is headed over at the ends thereof. The connections between the friction members and ring are located near the trailing ends of the friction members.

In operation, assuming the brake drum to be rotating in the direction indicated by the arrow in Figure 1, it will be seen that when braking liquid is forced under pressure into the wheel cylinder 4 the ends of the ring 7 are initially spread apart, but as soon as the upper friction member 5 comes into contact with the brake flange 3 of the drum the right hand end of the ring will become anchored upon its anchor pin 17 and the left hand end of the ring will continue moving away from its anchor pin 17, the ring 7 being expanded at this time to force the friction members at angularly spaced zones against the brake flange. The friction members will wrap into contact with the brake flange and immediately after the initial contact the torque of the portion of the upper friction member between the wheel cylinder 4 and the connection 18 is transferred to the ring to increase the expanding force on the ring and apply the lower friction member to the brake flange with an increased pressure. The torque of the lower friction member is then converted into a force more firmly urging the right hand end of the upper friction member against the brake flange by the connection 18 between the lower friction member and the ring. The wrap of the right hand end of the upper friction member is carried over to the left hand end of the upper friction member from which time similar cycles continue until the brake is released by releasing the pressure of the braking liquid entering the wheel cylinder. The internal friction device can then be returned to its normal or off position which is facilitated by reason of the inherent resiliency in the ring and also by reason of the retracting springs 20, 21 and 22. The spring 20 extends between the end portions of the ring while the springs 21 and 22 extend between the leading ends of the upper and lower shoes and the backing plate.

Figure 5 discloses another embodiment of my invention in which four friction members 23, 24, 25 and 26 are used, instead of two friction members, as in the modification illustrated in Figures 1 to 4, inclusive. Each of these friction members comprises a T-section brake shoe, the web of which is embraced by the U-section expansible ring 27 which is formed in the same manner as the ring 1, with the exception that it is anchored at its ends between the wheel cylinder 28 and the axial flange of the friction member 23 by the anchor pins 29. The web of the friction member 23 is cut away to accommodate the anchor pins and also the rivets which serve to secure the ends of the reinforcements 30 and the ring 27. It will be noted that the connection between the friction members and the ring for converting the torque of each of the friction members to an expanding force for the ring are located nearer one end of each of the friction members than the other end. This is preferably the trailing end so that a substantial amount of wrap of each friction member can be utilized.

What I claim as my invention is:

1. A brake comprising a brake drum, an annular series of friction members, a flexible ring transversely split in one zone only and expansible to force said friction members against said drum, means for relatively moving the ends of said ring at the split away from each other to expand said ring, and means directly connecting each of said friction members to said ring for converting the torque of each of said friction members when against said drum into an expanding force for said ring.

2. A brake comprising a brake drum, friction members, a flexible transversely split ring expansible to force said friction members against said drum, one of said friction members bridging the gap between the ends of said ring, anchors for the ends of said ring in different directions of rotation of said drum, means for relatively moving the ends of said ring away from each other to expand said ring, and connections between said friction members and ring for converting the torque of said friction members into an expanding force for said ring.

3. A brake comprising a brake drum, brake shoes, a flexible transversely split ring embracing portions of said brake shoes and expansible to force said brake shoes against said drum, one of said brake shoes having an integral portion bridging the gap between the ends of said ring, anchors for the ends of said ring in different directions of rotation of said drum, an actuator for relatively moving the ends of said ring away from each other to expand said ring, and members extending through and connecting said brake shoes and ring for converting the torque of said brake shoes into an expanding force for said ring.

4. A brake comprising a brake drum, T-section brake shoes, a flexible transversely split U-section ring embracing the webs of said brake shoes and expansible to force said brake shoes against said drum, one of said brake shoes bridging the gap between the ends of said ring, anchor means for the ends of said ring in different directions of rotation of said drum, an actuator for relatively moving the ends of said ring away from each other to expand said ring, and transverse pins extending through the webs of said brake shoes and the legs of said ring for converting the torque of said brake shoes into an expanding force for said ring.

5. A brake comprising a brake drum, brake shoes, a flexible transversely split ring expansible to force said brake shoes in angularly spaced zones against said drum, one of said brake shoes bridging the gap between the ends of said ring, reinforcing members secured to the ends of said ring and having generally radially inwardly extending projections, anchor means between said projections, an actuator between said projections for expanding said ring, and connections between said brake shoes and ring for converting the torque of said brake shoes into an expanding force for said ring.

6. A brake comprising a brake drum, brake shoes, a flexible transversely split ring expansible to force said brake shoes at angularly spaced zones against said drum, one of said brake shoes bridging the gap between the ends of said ring, reinforcements at the ends of said ring having generally radially inwardly extending projections, an actuator between said projections for expanding said ring, anchor means radially outwardly of said actuator engageable with said reinforcements, and connections between said brake shoes and ring for converting the torque of said brake shoes into an expanding force for said ring.

7. A brake comprising a brake drum, an expansible device having spaced ends, an annular series of friction members encircling said expansible device and having friction faces engageable with said drum, the portion of said friction members at one side of the gap between the ends of said expansible device being connected across the gap to the portion of said friction members at the other side of the gap, anchors for the spaced ends of said expansible device in different directions of rotation of said drum, means for relatively moving the spaced ends of said expansible device away from each other to expand said expansible device, and connections between said friction members and expansible device for converting the torque of said friction members into an expanding force for said expansible device.

8. A brake comprising a brake drum, friction members, a flexible transversely split ring expansible to force said friction members against said drum, one of said friction members bridging the gap between the ends of said ring, anchor means for said ring, means for relatively moving the ends of said ring away from each other to expand said ring, and connections between said friction members and ring for converting the torque of said friction members into expanding force for said ring.

9. A brake comprising a brake drum, a flexible expansible device having separable ends, friction members movable by said device against said drum, one of said friction members bridging the ends of said device, anchor means for the ends of said device in different directions of rotation of said drum, means acting independently of said bridging friction member for relatively moving the ends of said device away from each other to expand said device, and means between said device and said bridging friction member for converting the torque of said bridging friction member into expanding force for said device.

JOSEPH A. FORBES.